United States Patent [19]
Merkl

[11] 3,993,595
[45] Nov. 23, 1976

[54] ACTIVATED ALUMINUM AND METHOD OF PREPARATION THEREOF

[76] Inventor: George G. Merkl, 46 Sunset Court, Haworth, N.J. 07641

[22] Filed: Aug. 15, 1974

[21] Appl. No.: 497,560

Related U.S. Application Data

[63] Continuation-in-part of Ser. No. 211,979, Dec. 27, 1971, abandoned.

[52] U.S. Cl. .................................... 252/463; 75/169
[51] Int. Cl.[2] .......................................... B01J 21/04
[58] Field of Search ............... 252/463; 75/169, 138

[56] References Cited

UNITED STATES PATENTS

| | | | |
|---|---|---|---|
| 1,120,768 | 12/1914 | Uyeno | 75/146 |
| 1,863,254 | 6/1932 | Polin | 75/169 |
| 2,758,082 | 8/1956 | Rohrman | 75/138 X |
| 3,130,044 | 4/1964 | Flindt | 75/169 |
| 3,379,636 | 4/1968 | Reding et al. | 75/138 X |
| 3,574,607 | 4/1971 | Merkl | 75/169 X |
| 3,578,439 | 5/1971 | Merriman | 75/169 X |
| 3,619,176 | 11/1971 | Briody et al. | 75/138 X |

*Primary Examiner*—W. J. Shine
*Attorney, Agent, or Firm*—Arnold, White & Durkee

[57] ABSTRACT

Reactive aluminum consisting essentially of aluminum having a purity by weight of at least about 99.99% permeated by a liquid metal selected from mercury, gallium and gallium/indium alloys. The permeation can be accomplished at room temperature and atmospheric conditions. The reactive aluminum exhibits greatly altered physical and chemical properties as compared to the aluminum before permeation. These new properties include a uniform alignment of atomic grain boundaries and domains and a multitude of channels defined in the reactive aluminum.

15 Claims, 17 Drawing Figures

ACTIVATED ALUMINUM AND METHOD OF PREPARATION THEREOF

REFERENCE TO RELATED APPLICATIONS

This is a continuation-in-part of Ser. No. 211,979 filed Dec. 27, 1971, now abandoned.

Reference is had to my co-pending applications: Ser. No. 176,907, filed Sept. 1, 1971, now abandoned; Ser. No. 305,819, filed Nov. 13, 1972; Ser. No. 331,766, filed Feb. 12, 1973; Ser. No. 469,125, filed May 13, 1973; Ser. No. 345,659 filed Mar. 28, 1973, now U.S. Pat. No. 3,856,841; Ser. No. 319,293, filed Dec. 29, 1972; and Ser. No. 383,986, filed July 30, 1973, now abandoned.

BACKGROUND OF THE INVENTION

The present invention relates to a reactive aluminum and processes for the formation thereof.

The instant reactive aluminum is suitable for use as a catalyst, initiator for reactions, and as a reactant for forming novel organo aluminum and other compounds. Numerous examples of novel processes and products obtainable with the reactive aluminum are given in the aforesaid copending applications.

SUMMARY OF THE INVENTION

The reactive aluminum of the present invention consists essentially of aluminum having a purity by weight of at least about 99.99% permeated by a metal selected from mercury, gallium and gallium/indium alloys. The reactive aluminum is prepared by contacting, at a temperature not exceeding 200° F, an aluminum having a purity of at least about 99.99% by weight, in the presence of a source of hydrogen ions, with a liquid metal selected from mercury, gallium and gallium/indium alloys.

BRIEF DESCRIPTION OF THE DRAWINGS

For a fuller understanding of the nature of the invention, reference is had to the drawings.

THE INVENTION

Figure 1:
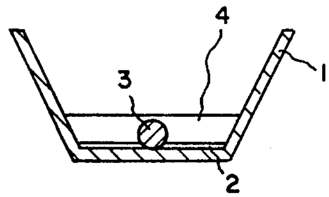
FIG. 1 is a sectional elevational view of one embodiment of the present invention.
Figure 2:
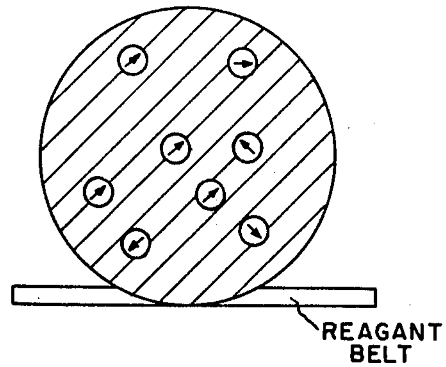
FIG. 2 is a pictorial sectional elevational view of an early stage in the present method.
Figure 3:
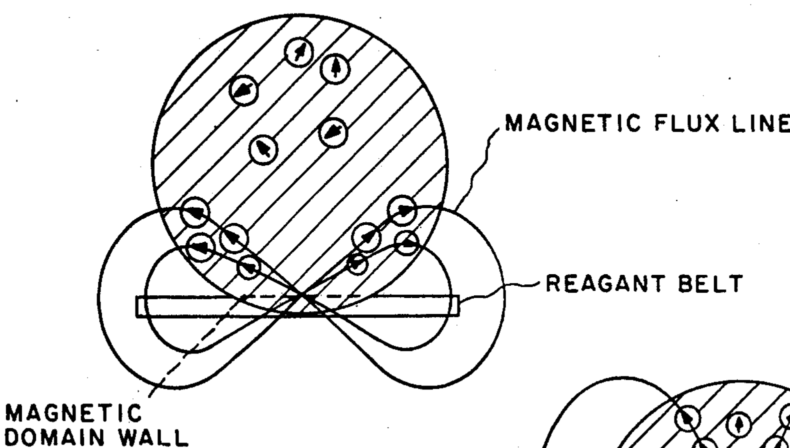
FIG. 3 is a pictorial sectional elevational view showing the progressive alignment of magnetic dipoles in the present method.

The present invention relates to a method of forming a reactive aluminum for use in chemical reactions, and to the reactive aluminum so produced.

The reactive metal is formed by permeating aluminum having a purity by weight of at least about 99.99% with a liquid metal selected from, gallium and gallium-/indium alloys mercury. Preferable, the liquid metal has a purity of at least 99.99% by weight.

In the case of mercury, at least about 0.1% or at least 1% by weight is permeated to obtain the reactive aluminum. The nature of the aluminum inherently sets the upper limit to about 5% by weight.

For gallium or gallium/indium alloys, only about 0.01% by weight is needed and about 0.1% is preferable. Again, the maximum of a few percent is determined by the nature of the aluminum. Higher amounts are simply not retained by the aluminum.

Surprisingly, the permeation can take place at room temperature and atmospheric pressure, merely by contacting the aluminum and liquid metal(s) in the presence of an aqueous acid or an aqueous alkaline solution or an alcohol or some other hydrogen ion source.

It may be desirable to add heat to accelerate the permeation. Sufficient heat to maintain gallium as a liquid is desirable. In general, elevated temperatures are undesirable because these temperatures disrupt the changes in the internal structure of the aluminum which are necessary to form the reactive aluminum.

Preferably, the temperature of the aluminum should not exceed 200° F and should be about 70° F. The internal temperature for a surface temperature of 120° F can be 180° to 200° F. A temperature from 40° to 100° F is preferred. The aluminum exhibits reactive greatly altered physical and chemical properties as compared to the aluminum before the permeation. The new properties include uniform alignment of grain boundaries and domains and a multitude of tiny channels defined in the reactive aluminum. These channels for certain cases are visible at the surface of the reactive aluminum with the aid of a magnifying lens.

Generally, the aluminum can have any shape, but the size of the aluminum should not fall below about 1/32 inch for the longest dimension and 1/64 inch for the smallest dimension. The reaction for very small particles, particularly powder, takes place very rapidly and is highly exothermic and the elevated temperatures produced prevent the formation of the reactive aluminum. For small particles such as powder, even cooling to a very low temperature will not form the reactive aluminum, but, instead an ordinary amalgam will form.

It is convenient to use aluminum in the form of a rod because highly pure aluminum is commercially available as rods. Rods having a diameter of about ½ inch are preferable. Such a rod will be used in the examples.

Impurities in the aluminum can promote or slow down the permeation according to the invention. For example, impurities of magnesium, cesium, gallium, zirconium, thorium, lanthanium, hafnium, titanium, thallium, palladium, and nobium promote the permeation. Impurities of chromium, copper, iron, silver, molybdenum, nickel, tungsten, and cobalt slow down the permeation and could poison the process.

The presence of impurities is one of the key problems with prior art attempts to produce an reactive aluminum. The presence of impurities can give rise to local anodic reactions which can pit and disintegrate the aluminum. Thus, prior art amalgamation methods have not recognized the use of aluminum having a purity by weight of about 99.99% and have thereby resulted in anodic reactions. Unbalanced magnetic fields are produced so that no substantial atomic alignment is obtained. Aluminum having a purity of 99.999% by weight or higher is desirable.

Surprisingly, even aluminum having a purity by weight of somewhat less than 99.99% becomes purged of impurities when being permeated according to the invention and actually becomes purer.

The disclosure of the parent application Ser. No. 211,979, filed Dec. 27, 1971, and now abandoned is herein specifically incorporated by reference. This is being done to avoid unnecessary repetition.

Illustrative, non-limiting examples of the practice of the invention are set forth below. Numerous other examples can readily be evolved in the light of the guiding principles and teaching contained herein. The examples are intended merely to illustrate the invention and not in any sense to limit the manner in which the invention can be practiced. The parts and percentages recited herein and all through the specification, unless specifically provided otherwise, refer to parts by weight and percentages by weight.

FIG. 1 illustrates one embodiment of the present invention. A non-reactant vessel 1 such a glass reactor contains liquid mercury 2 with a purity by weight of at least about 99.9%, an aluminum rod 3 having a purity by weight of at least about 99.99% and a hydrogen ion source 4 such as an aqueous alkaline solution or an aqueous acid such as hydrochloric acid 4. Even hot water can be used as the hydrogen ion source but the aqueous acid, is faster. The acid can have a concentration by weight of about 5 to 10%.

The aqueous amount of the acid is not critical but preferably should cover the rod 3 to prevent the formation of an aluminum complex on the rod 3 exposed to the air. This aluminum complex is the subject of the co-pending application Ser. No. 176,907.

The quantity of the mercury 2 is not critical because the rod 3 floats in mercury. Not much more than about 5% by weight of the mercury 2 can be permeated into the rod 3 so this can be used as a guide to the quantity of mercury 2 employed. Also, the quantity of the mercury 2 should preferably be sufficient to maintain contact with the rod 3 throughout the reaction to thereby conduct heat away.

It is well known that aluminum metal exposed to air and moisture forms an aluminum oxide coating. The rod 3 can be treated to remove its aluminum oxide coating before the permeation. This treatment can be done in one of the known methods, such as filing the outer surface or applying a concentrated acid. The permeation proceeds faster if the aluminum oxide coating has been removed at least partially.

If the rod 3 has not been stripped of the oxide coating, the initial stages of the reaction show the occurrence of bubbles on the rod 3 at the interface with the aqueous acid. After the stripping stage has passed, there is a striking change in the size of the bubbles rising to the surface of aqueous acid. The size of these bubbles is at least an order of magnitude smaller than the initial bubbles.

As the reaction proceeds, the rod 3 tends to sink into the mercury 2 due to the mercury 2 permeated into the rod 3. Eventually, the mercury 2 permeates through the rod 3 and appears at the top surface of the rod 3. This is one indication that a reactive aluminum has been formed. Another indication that a reactive aluminum has been formed is that numerous tiny bubbles begin eminating from the top surface of the rod 3.

Many factors affect the rate of reaction. These include temperature, local electric field intensity, acid concentration, impurities in the rod 3, and the amount of the mercury 2 used because the mercury 2 also serves as a heat sink.

The time to react a 100 gram rod of aluminum about 99.99% pure by weight is about 2 hours for one normal acid. This time is reduced to 1 hour for two normal acid and can be as short as 10 minutes for concentrated acid.

At least about 0.1% by weight of mercury permeated into the aluminum is preferred to obtain the reactive aluminum. Between 1% to 3% mercury is preferred.

The quantity of mercury in the reactive aluminum can be reduced by heating the reactive aluminum. Cooling, such as by the application of cold water can be used to stop the loss of mercury from a hot reactive aluminum.

Generally, the permeation can be carried out at room temperature and ambient pressure.

Figure 5:
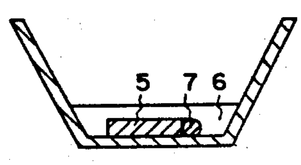
FIG. 5 is a pictorial sectional elevational view of another embodiment of the present invention.

FIG. 5 shows another preferred embodiment. Again, the vessel 1 is used with an aluminum rod 5 and hydrochloric acid 6. A second metal 7 of gallium or indium is contacted with rod 5. The metal 7 can be about 0.1 to 1% by weight of rod 5. If rod 5 is freshly cut, then metal 7 is preferably contacted with the freshly cut end because it is essentially free from the aluminum oxide coating.

The gallium or indium used should preferably have a purity by weight of at least 99.9%.

Not much more than about 3% by weight of gallium or indium can be permeated into the rod 5. At least about 0.01% by weight is needed to form the reactive aluminum. A range of about 0.1% to 1% is preferred.

Combinations of gallium, indium, and mercury can be used to form a reactive aluminum, but certain combinations can result in a disintegration of the reactive aluminum. The disintegrated reactive metal has a relatively poor quality but still shows unique properties.

An alloy of about 10% by weight indium with the balance being gallium is desirable whereas, if the indium were about 30% disintegration would result.

Preferably, a single metal should be use. It is also desirable to have the metal in a liquid or at least pliable state to permit the rapid permeation into the aluminum. A hydrogen ion source of hot water is satisfactory for gallium.

In the case where gallium is permeated into aluminum in the presence of an acid, it has been observed that the reactive aluminum obtained forms a brown complex on its surface on exposure to air. The formation of this complex can be avoided by leaving the freshly made reactive aluminum in anhydrous alcohol or benzene or a similar liquid which is anhydrous and has an affinity for water.

The acid illustrated above can be replaced by an aqueous alkaline solution such as a hydroxide of sodium or potassium or the like in water or an alcohol such as methanol or ethanol or the like. Even water can be used although the reaction would take place very slowly. The acid could be an inorganic acid such as hydrochloric or nitric acid or an organic acid such as acetic or ascorbic acid.

A reactive aluminum can be formed with gallium or indium and an aluminum rod in two steps as follows. Aluminum in the form of a rod is contacted with about 1% by weight of either gallium or a gallium-indium alloy (10% indium) in the presence of either an aqueous acid or water at 200° F for 10 to 30 seconds. Then the rod and metal are transferred to an anhydrous alcohol or preferably benzene for several hours to permit the permeation to complete.

PHYSICAL EXPLANATION

The present invention achieves physical changes in the aluminum at an atomic level and these changes are complex. The following is an extensive explanation offered in an endeavor to indicate the profoundly unique phenomena arising from the instant invention. As the atomic changes are many fold, the explanation has many ramifications and these ramifications will be presented in different degrees of complexity to establish different levels of interpretation of effects.

Generally, permeating the aluminum with a selected second metal is comparable to bombarding the aluminum with protons. In the case where the aluminum is in a rod form being treated in accordance with FIG. 1, positive ions migrate or diffuse upwards while negative ions migrate downward.

The movement of ions and electrons within the aluminum gives rise to a multidimensional magnetic field.

Figure 4:
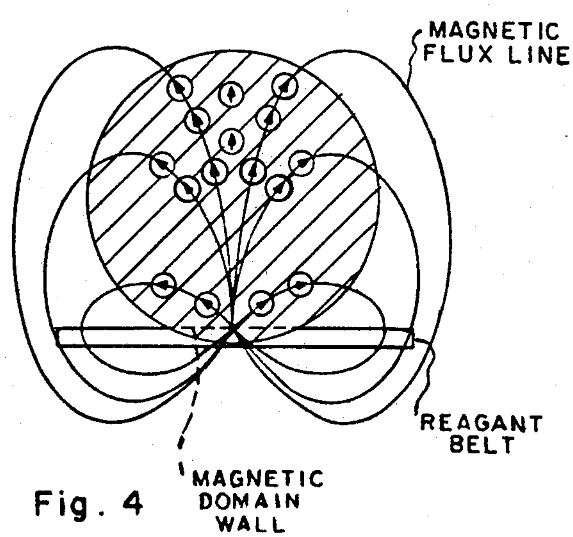
FIG. 4 is a pictorial sectional elevational view showing a further stage of the progressive alignment of magnetic dipoles in the present method.

For a rod of circular cross section and essentially the same temperature on opposite sides, the positive ion migration paths form equal angles with a vertical plane bisecting the rod. These paths follow the flux lines shown in FIG. 4. It is convenient to call this phenomena the "louvre effect". The accumulated result of the positive ion migration is the formation of micro-channels. These micro-channels are believed to form an essential part in the outstanding chemical activity of the reactive aluminum.

In accordance with classical physics, the positive ion migration gives rise to magnetic fields having flux lines approximately parallel to the rod axis or, in simple terms, 90° from the rod axis.

The positive ion migration is effectively a plasma stream which aligns the atomic structure of the aluminum to produce aligned dipole moments generating a magnetic field which couples to the positive ion migration. The ion migration dislocates aluminum atoms and this is evidenced by the apparent erosion of the upper surface of a rod exposed to air as shown in FIG. 6A to 6F.

Figure 6F:
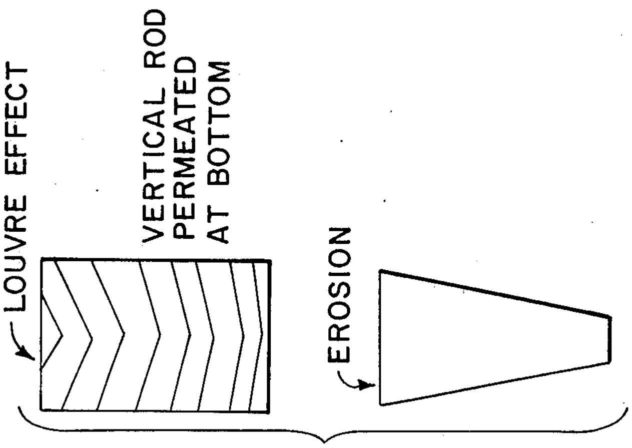
FIG. 6 is an end elevational view showing different erosion patterns of aluminum permeated under different conditions.
Figure 6E:
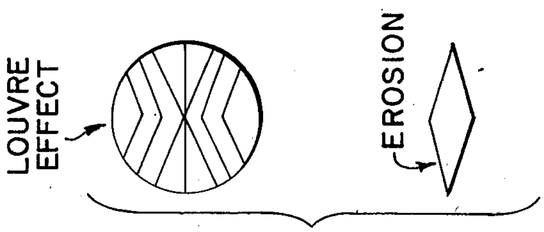
Figure 6D:
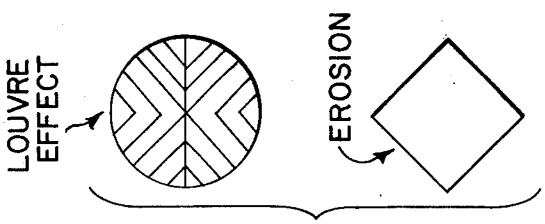
Figure 6C:
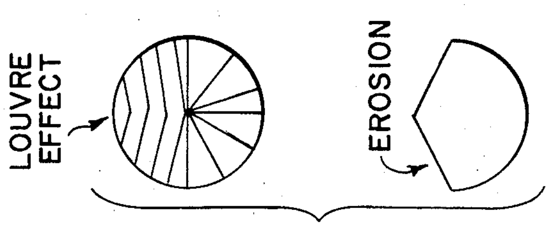
Figure 6B:
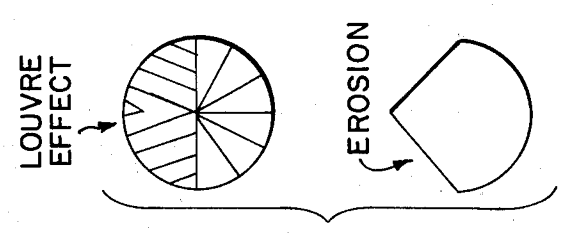
Figure 6A:
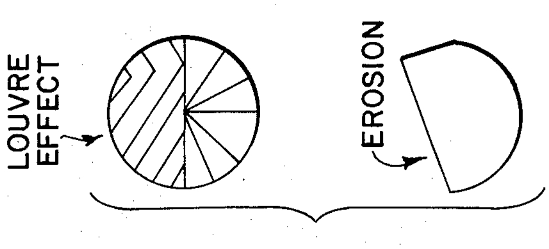

If one side of the rod is at a higher temperature than the other side, that side will have a higher positive ion migration rate as physically evidenced by the greater surface erosion as shown in FIG. 6B. FIGS. 6C, 6D, 6E, and 6F show different rod erosions actually obtained by controlling the local rod temperature to increase or decrease the ion migration rate.

Surprisingly, the bottom portion of the rod erodes uniformly and does not show the variations obtained with the top portion of the rod.

The ion migration or plasma flow occurs along grain boundaries and the formation of the micro-channels is physical evidence that atomic lattice alignment has been obtained. Surprisingly, the ion migration carries heat from inside the aluminum to its surface.

Generally, it is desirable to use relatively low temperatures, room temperature or even at about 40° F, to obtain reactive aluminum having very high chemical activity with wide domains in the order of 40 to 80A. Of course, the permeation usually takes a longer time at low temperatures to obtain the reactive metal.

If the rod is rotated, say 90°, after the appearance of micro-channels evidencing lattice alignment, the process will first have a destructive affect on the special properties of the rod before the reactive aluminum is formed again.

Surprisingly, tests by different independent laboratories indicate that the reactive aluminum exhibits properties confusingly similar to a transitional metal.

The positive ion migration eventually produces an expansion of domain walls for an active migration. Although the ion migration starts out slowly at room temperature, the migration increases for many reasons. One reason arises from the coupling of the magnetic fields which reinforces the ion migration. Another reason is that higher temperatures are produced by the active electrons and protons formed within the rod. In the case where mercury is used, ultraviolet radiation is produced and this radiation excites electrons in the aluminum. Ultraviolet radiation on the rod being permeated stimulates the process.

It is of interest to note that for physically small aluminum, the magnetic fields cannot couple because the magnetic field due to the ion migration dominates. In the absence of the coupling, atomic domain expansion occurs and the temperature becomes elevated to the point that no reactive aluminum is obtained.

Figure 7:
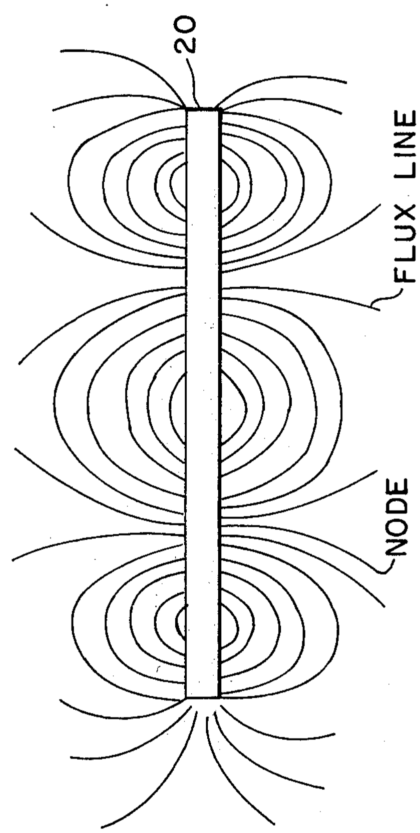
FIG. 7 is a pictorial plan view of a reactive aluminum being formed in accordance with the present invention.

A further magnetic field is generated in an elongated rod 20 as shown in FIG. 7. It is of interest that the movement of the surface of an acid just covering the aluminum being treated shows a current pattern similar to the flux lines illustrated in FIG. 7. Hydrogen ion absorbtion takes place at the nodes. These nodes are chemically active regions for chemical reduction.

During the permeation of the aluminum migration of electrons and hydrogen ions readily occurs in the aluminum in addition to the ion migration. The electrons become available at the upper surface for chemical reactions.

The hydrogen ion and metal diffusion or migration in the aluminum developes a high mobility even through the atomic lattice.

It is well known that hydrogen possesses quasimetallic properties. The presence of hydrogen ions in the atomic lattice results in an electron cloud forming about each hydrogen ion. For aluminum, the electron cloud is formed from "S" level electrons so that within the aluminum there is formed $Al^{+++}$, $Al^{++}$, and $Al^{+}$. The uniformity and degree of aluminum ionization depends on the degree of hydrogen ions available. The lower levels of ionization are, of course, more likely to occur for relatively low levels of hydrogen ion diffusion.

It is of interest that a faint visible blue glow has been observed at the upper surface of an aluminum rod being permeated with mercury. This shows that protons are ejected at the upper surface.

The presence of aluminum ions and hydrogen ions gives rise to highly active chemical properties of the reactive aluminum. The aforementioned co-pending applications provide examples of the utilization of these chemical properties.

The electron and hydrogen ion diffusion contributes to a quasi-superconductive condition within the aluminum. This diffusion tends to flow towards the outer surface of the aluminum. The electrons being lighter and smaller move faster so that an excess of hydrogen ions remains to enhance the positive charge within the aluminum. This positive charge then tends to inhibit electron diffusion. Thus, the electron and hydrogen ion diffusion are strongly interdependent. The coupling of the magnetic fields enhances the hydrogen ion diffusion to form independent diffusions. Before this occurs, a considerable amount of hydrogen gas may accumulate at the surface of the aluminum.

During the process according to the present invention, hydrogen atoms readily enter the aluminum, but the permeated aluminum does not appear to exhibit properties associated with hydrogen embrittlement.

In the case where the metal hydride is formed by contacting the aluminum and liquid metal in the presence of an hydrogen ion source such as an aqueous acid or an aqueous alkaline solution or alcohol, the hydride forms exothermically at the interface between the metals. For aluminum and mercury, there is formed $H^+$, e, $Al^{+++}$, $Hg^+$, and HgH along with AlH (air) →Aluminum Hydroperoxide (blue). For aluminum and gallium, the reaction in an aqueous acid or even water may proceed too rapidly, resulting in an elevated temperature and disintegration. This is believed to be due to the presence of $H_2O$ inhibiting the formation of $GaH_2$. That is why it is preferred to initiate the permeation of gallium in water but to complete the diffusion in anhydrous alcohol or benzene or other anhydrous liquid having an affinity for water.

In addition, it is desirable to use an indium-gallium alloy instead of gallium alone because the indium polarizes hydrogen ions yielding a valuable effect. The indium supplies the gallium with $H^+$ and maintains it as a hydride to prevent the formation of GaOH. The presence of indium with the gallium, however, tends to inhibit ion migration and the development of the plasma flow because of the polarized $H^+$ unit within the atomic lattice of the aluminum. Hydrogen forms exothermically and expands the atomic lattice so that disintegration of the aluminum occurs. An alloy of about 10% by weight of indium is satisfactory but 30% is less desirable because of the tendency to disintegrate the aluminum rapidly.

Figure 8:
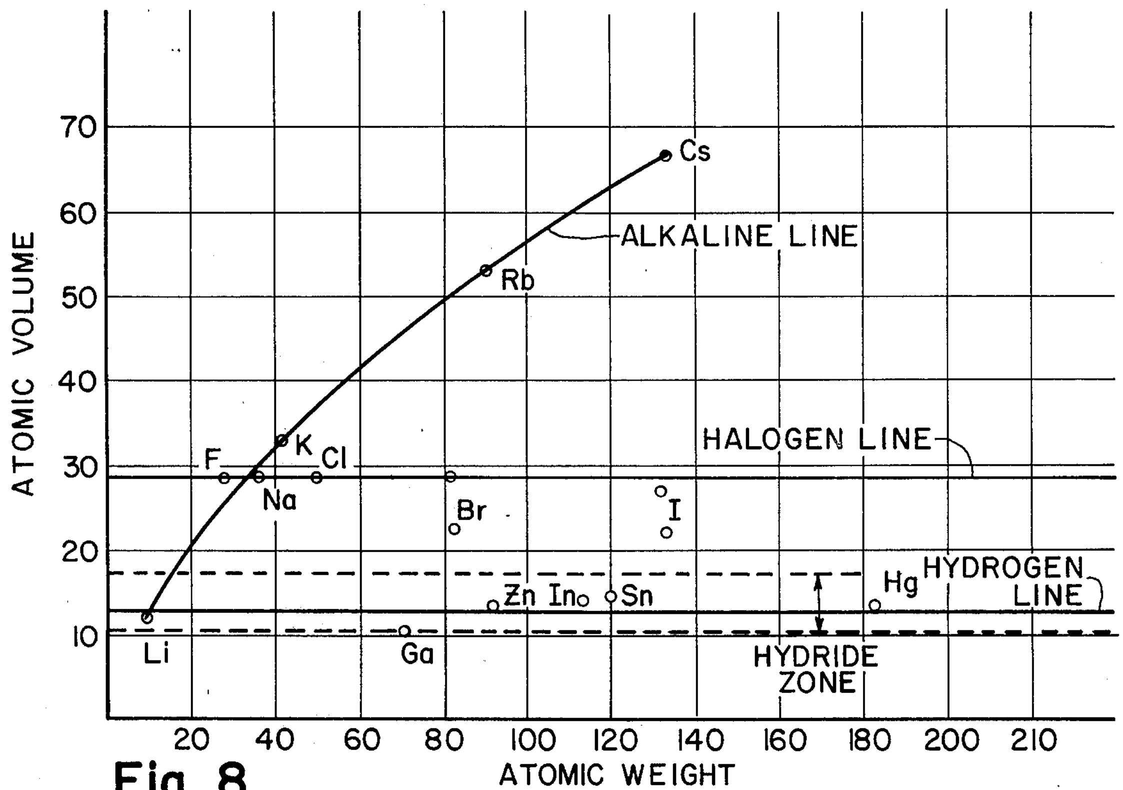
FIG. 8 is a graph of selected elements with coordinates for the atomic weight and atomic volume.

Generally, the metal permeated through the aluminum should be a hydride forming metal having an atomic volume close to that of hydrogen. FIG. 8 shows a graph comparing some selected elements to hydrogen. The preferred range of atomic volumes is indicated with respect to the hydrogen line and is labeled "Hydride zone". Below the Hydride Zone, the activity of the elements in the present process decreases. These elements are mainly transitional elements having high melting temperatures. Above the Hydride Zone, the activity increases and, it is noted, melting points decrease. It is of interest that during the permeation process the permeated metal becomes excited on an atomic level and its effective volume decreases. This decrease in volume may account for the increase rate of diffusion. The presence of an elevated temperature increases the effective volume of the atoms of the permeated metal and the increased activity can weaken magnetic moments in the aluminum and result in it becoming brittle.

Increasing the temperature of the permeation process can be used to overcome the adverse affect of atmospheric pressure but preferably the temperature should not go above 100° F.

The local static electric field is also a factor affecting the permeation. For low static electric fields some heat can be added to promote the permeation without disrupting the formation of the reactive aluminum. This is not true for high static electric fields.

The indium in conjuction the gallium appears to desirable because of the unusual properties exhibited by indium. For example, a small indium rod placed between two activated aluminum rods each formed with a mercury or gallium will align itself with the two reactive aluminum rods. Also, indium near a reactive aluminum in water will absorb the $H^+$ produced by the reactive aluminum and release hydrogen in the form of relatively large bubbles.

Figure 9:
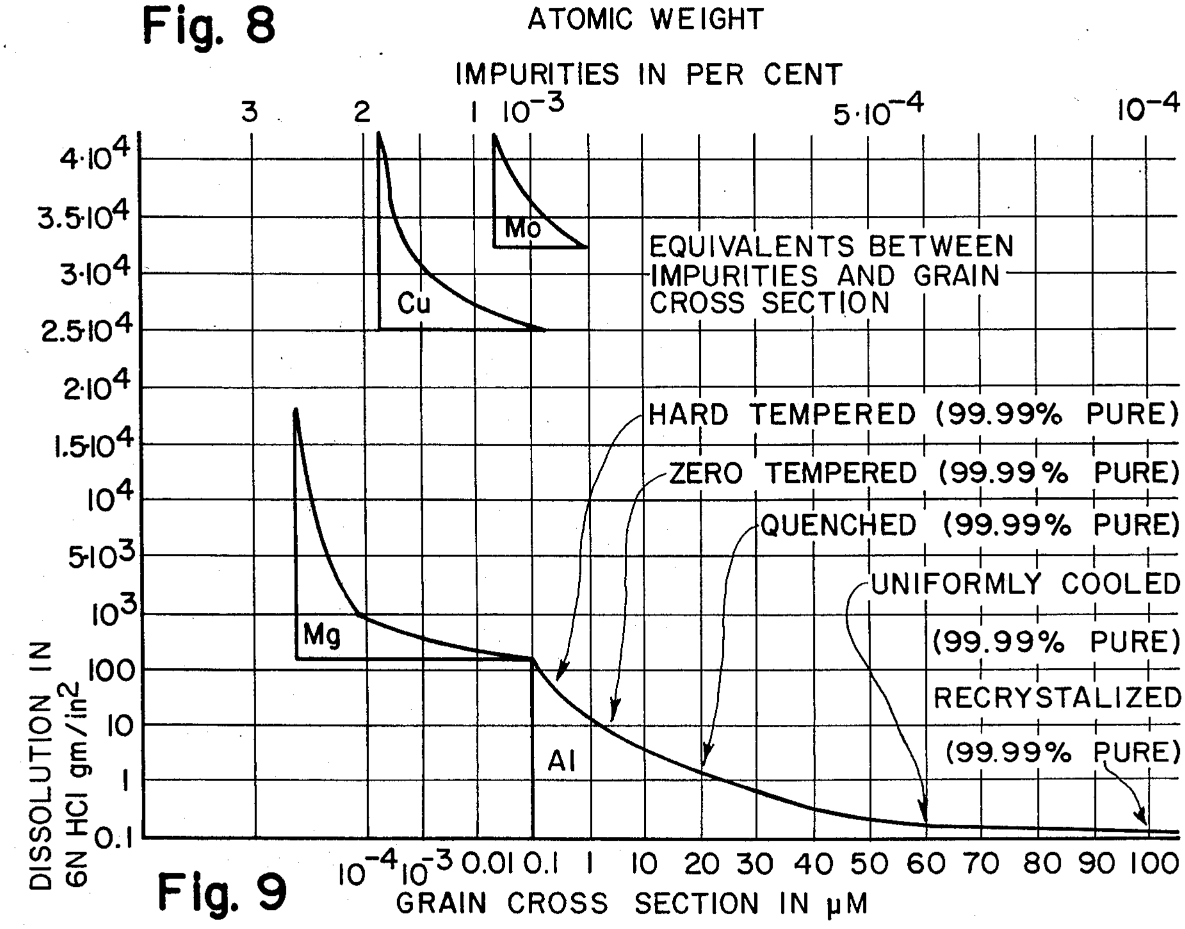
FIG. 9 is a graph showing dissolution of several metals versus grain cross section for different impurities.

Generally, it is preferable if the aluminum is at least about 99.99% pure by weight and free of bends and twists as the physical distortions interfere with the grain alignment during the permeation process. Soft metal is preferable to hard metal. FIG. 9 graphically compares grain alignment to impurities and dissolution in hydrochloric acid for different metals.

This graph shows that amalgam formation is avoided by the selection of grain size and purity so prior art results are thereby avoided.

Surprisingly, the aluminum increases its purity as a result of the permeation process. This is observable as the appearance of dark parts in the hydrogen ion source used. Thus, even purities of 99.95% or, such as found in commercial ingot can be used in the practice of the invention because the aluminum increases its purity due to the permeation.

The reactive aluminum exhibits many diverse surprising properties. For example, a gallium or indium prepared reactive aluminum acts as an oxidative converter. The introduction of $0^{=}$ at one side of the reactive aluminum exits as $0 + 2e$ at the opposing side. Also, reacting 100 grams of alcohol and $0^{=}$ at the surface of the reactive aluminum results in 60 grams of $COOC_2H_5$:

$$3C_2H_5OH + 40^{=} \rightarrow 2COOC_2H_5 + 3H_2O + H_2$$

It is interesting that a mercury treated aluminum takes about five days to achieve the above conversion whereas indium or gallium-indium treated aluminum takes about five minutes.

The reactive aluminum can also serve as a diffusion converter. Mercury hydride introduced at one side of a reactive aluminum exits art the opposing side as $Hg+e+H^+$. Also, nitrogen dioxide at one side forms:

$$NO_2 + 2H^+ \rightarrow NH_2 + O_2$$

In the presence of $H_2O$, this reaction forms $NH_2HO_2$.

A further example is a fuel cell. Hydrogen gas at one side of a reactive aluminum results in $4H^+ + 4e$. Oxygen gas added to this reaction results in water plus electrical power.

Surprisingly, an alloy of aluminum and magnesium having impurities of less than about 0.01% by weight can be used. It is, of course, important to have the impurities less than 0.01% by weight.

The reactive aluminum also exhibits unusual properties including a tunnel effect, semiconductor effect and apparent superconducting. These properties along with some other related properties will now be considered.

Generally, the conductivity of a metal depends upon the degree of overlapping of magnetic fields of adjacent atoms which thereby affects the movement of transfer of electrons through the metal. At elevated temperatures, the atomic magnetic fields overlap considerably so that effective cancellation of magnetic fields results. At very low temperatures, there is little atomic magnetic field overlap with negligible effective magnetic field cancelation and superconducting becomes possible.

Figure 10A:
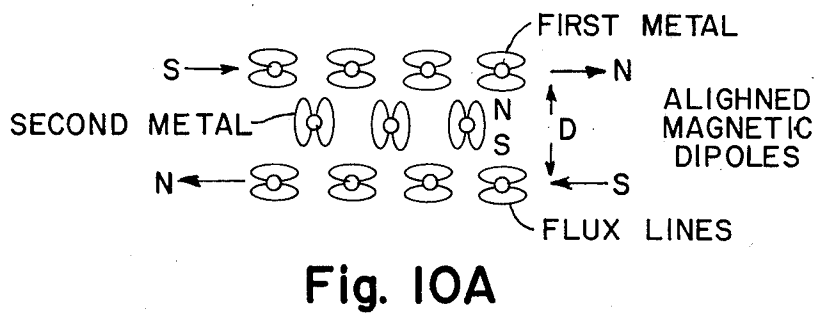
FIG. 10 is a pictorial view of a representation of the atomic alignment in a reactive aluminum according to the present invention.
Figure 10B:
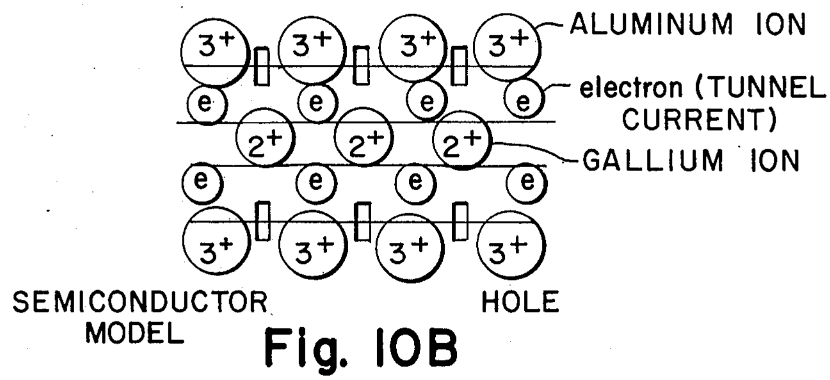

Within an aligned domain of a reactive aluminum, there will be an arrangement of atoms of the aluminum to produce magnetic dipoles to generate a magnetic field having a given orientation. Adjacent this line of atoms is a line of atoms of the second permeated metal oriented to produce magnetic dipoles to generate an orthoxgonal magnetic field opposite the first magnetic field. This is illustrated in FIG. 10. The spacing between the adjacent lines of atoms is represented by "D". A D of about 30A gives rise to tunnelling.

Ordinarily, an electron traveling through metal follows a discontinuous randomly segmented path. The formation of elongated tunnel through the metal would provide a fast direct path for both electrons and holes in the metal. The electrical resistance of the tunnel path depends on its width.

A typical atomic cross section is about 1A to 5A whereas a magnetic moment is about 10A to 15A. Thus, properly spaced tunnels can permit the ready transfer of electrons into the tunnels because the magnetic moment determines electron mobility and electron transfer is favored for tangential magnetic moments such as in lines of atoms described above.

A reactive metal of aluminum permeated with mercury shows the tunnel effect but it is relatively inefficient because it does not include many holes.

A gallium prepared reactive aluminum degassed at an elevated temperature shows a relatively large number of holes. A gallium-indium prepared reactive aluminum shows even more holes.

Whether the reactive aluminum shows superconductive or semiconductor properties depends upon the formation of the reactive aluminum.

Experiments show that the tunnel resistance of aluminum appears to be independent of temperature. Also, degassing appears to reduce the tunnel resistance.

It has been demonstrated that an excessively large plasma in an reactive aluminum can destroy the tunnelling and even the alignment of magnetic dipoles. This shows why temperature above 100° F should be avoided because the plasma in the aluminum increases considerably.

In addition, it has been demonstrated that a reactive aluminum exhibits a heat conductivity much higher than untreated aluminum. This is believed to be a direct result of the alignment of the grains which then behaves as a single crystal. This unique property makes reactive aluminum suitable for use as a heating element wherein current is sent through to produce the heat.

A reactive aluminum 4 inch by 4 inch by ½ inch increased its temperature from room temperature to about 185° F in 10 minutes with about ½ ampere through it. This temperature change is due to an increase in lattice vibrations and not due to ohmic losses. This phenomena appears to be due to a combination of the tunnelling and semiconductor effects in the reactive aluminum.

Figure 11:
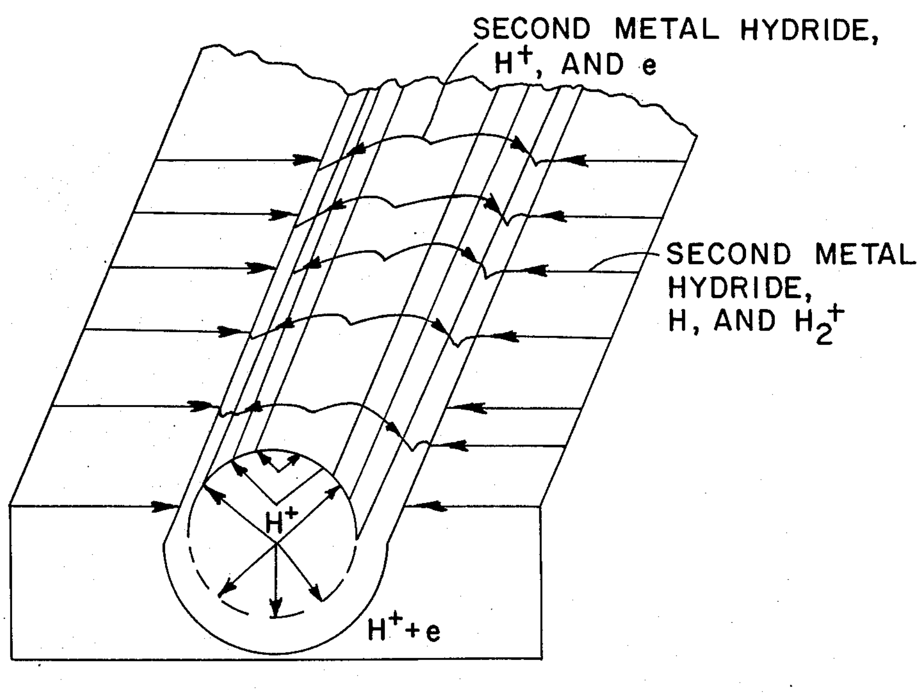
FIG. 11 is a pictorial perspective view of a reactive metal being prepared according to the present invention.

FIG. 11 is a further pictorial perspective view of a reactive metal being formed according to the present invention. Hydrogen ions and electrons exit at the lower part of the rod while the second metal hydride, hydrogen ions, and electrons exit at the upper part of the rod. The circulation between the lower and upper parts of the rod is indicated. In addition, the internal movement of ions in the rod gives rise to the louvre effect. The circulation between the parts of the rod through the reactor liquid gives rise to a magnetic field. Surprisingly, a rod only slightly covered with an acid and suddenly removed leaves behind circulation which continues for awhile and is observable.

I claim:

1. A method of preparing a reactive aluminum which comprises:

contacting at a temperature not in excess of 200° F a. aluminum metal, characterized by i. a purity of at least about 99.99% by weight;

ii. a long dimention of not below about 1/32 inch; and iii. a short dimension of not below about 1/64 inch; with b. a liquid metal selected from mercury, gallium and gallium/indium alloys;

in the presence of c. a liquid source of hydrogen ions selected from aqueous acid solutions and aqueous alkaline solutions covering said aluminum metal, whereby said liquid metal (b) permeates said aluminum (a) forming a reactive aluminum.

2. The method of claim 1 wherein the contacting is carried out at ambient temperature and atmospheric pressure.

3. The method of claim 1 wherein said aluminum is in the form of a rod.

4. The method of claim 3 wherein the aluminum rod is free of bends and twists.

5. The method of claim 1 wherein the aluminum metal (*a*) is soft.

6. The method of claim 1 wherein said liquid metal (*b*) is mercury.

7. The method of claim 1 wherein said liquid metal (*b*) is gallium or a gallium/indium alloy.

8. The method of claim 7 further including removing the reactive aluminum from contact with the source of hydrogen ions and thereafter introducing the reactive aluminum into an anhydrous liquid medium having an affinity for water.

9. The method of claim 1 wherein said aqueous acid solution is an aqueous solution of an inorganic acid.

10. The method of claim 9 wherein said inorganic acid is hydrochloric acid.

11. The method of claim 1 wherein said aluminum metal (*a*) is ingot grade aluminum metal, the minimum purity of at least 99.99% by weight being achieved during the permeation method by purging of impurities from said ingot grade aluminum.

12. The method of claim 1 wherein the temperature is from 40° to 100° F.

13. Reactive aluminum prepared by the method of claim 6.

14. Reactive aluminum prepared by the method of claim 7.

15. Reactive aluminum comprising aluminum metal, characterized by:

i. a purity of at least about 99.99% by weight;

ii. a long dimension of not below about 1/32 inch; and iii. a short dimension of not below about 1/64 inch; having distributed throughout its mass from about 0.1% to about 5.0% by weight mercury.

* * * * *